(12) United States Patent
Som et al.

(10) Patent No.: US 12,158,517 B1
(45) Date of Patent: Dec. 3, 2024

(54) RANGE-GATED IMAGER

(71) Applicant: RAPSODO PTE. LTD., Singapore (SG)

(72) Inventors: Temucin Som, Singapore (SG); Evgeny Lipunov, Singapore (SG); Batuhan Okur, Singapore (SG)

(73) Assignee: Rapsodo Pte. Ltd., Singapore (SG)

( * ) Notice: Subject to any disclaimer, the term of this patent is extended or adjusted under 35 U.S.C. 154(b) by 0 days.

(21) Appl. No.: 18/654,493

(22) Filed: May 3, 2024

(51) Int. Cl.
| | | |
|---|---|---|
| *G01S 13/88* | (2006.01) | |
| *A63B 24/00* | (2006.01) | |
| *G01S 13/58* | (2006.01) | |
| *G01S 13/86* | (2006.01) | |
| *H04N 23/66* | (2023.01) | |
| *A63B 102/32* | (2015.01) | |

(52) U.S. Cl.
CPC ........ *G01S 13/867* (2013.01); *A63B 24/0021* (2013.01); *G01S 13/584* (2013.01); *G01S 13/88* (2013.01); *H04N 23/66* (2023.01); *A63B 2024/0034* (2013.01); *A63B 2102/32* (2015.10); *A63B 2220/36* (2013.01); *A63B 2220/807* (2013.01); *A63B 2220/89* (2013.01)

(58) Field of Classification Search
CPC ...... G01S 13/867; G01S 13/584; G01S 13/88; H04N 23/66; A63B 24/0021; A63B 2102/32; A63B 2024/0034; A63B 2220/36; A63B 2220/807; A63B 2220/89
See application file for complete search history.

(56) References Cited

U.S. PATENT DOCUMENTS

| 9,955,126 B2 | 4/2018 | Yeo et al. | |
|---|---|---|---|
| 11,988,775 B1 * | 5/2024 | Waschura | ............. G01S 7/4815 |

FOREIGN PATENT DOCUMENTS

| EP | 1711844 | 10/2009 |
|---|---|---|

* cited by examiner

*Primary Examiner* — Timothy A Brainard
(74) *Attorney, Agent, or Firm* — Fish & Richardson P.C.

(57) ABSTRACT

Embodiments are disclosed for a range-gated imager. In some embodiments, a method comprises transmitting, with a multi-tone continuous wave (MTCW) radar, a radar signal comprising a first tone and a second tone, where the first tone and the second tone are separated by a frequency gap; receiving, with the MTCW radar, a return signal from a projectile impinged by the radar signal; detecting, with a measuring apparatus, a zero crossing of a phase difference between the first and second tones; and responsive to detecting the zero crossing, gating or triggering, by the measuring apparatus, an imager to capture an image of the projectile.

22 Claims, 9 Drawing Sheets

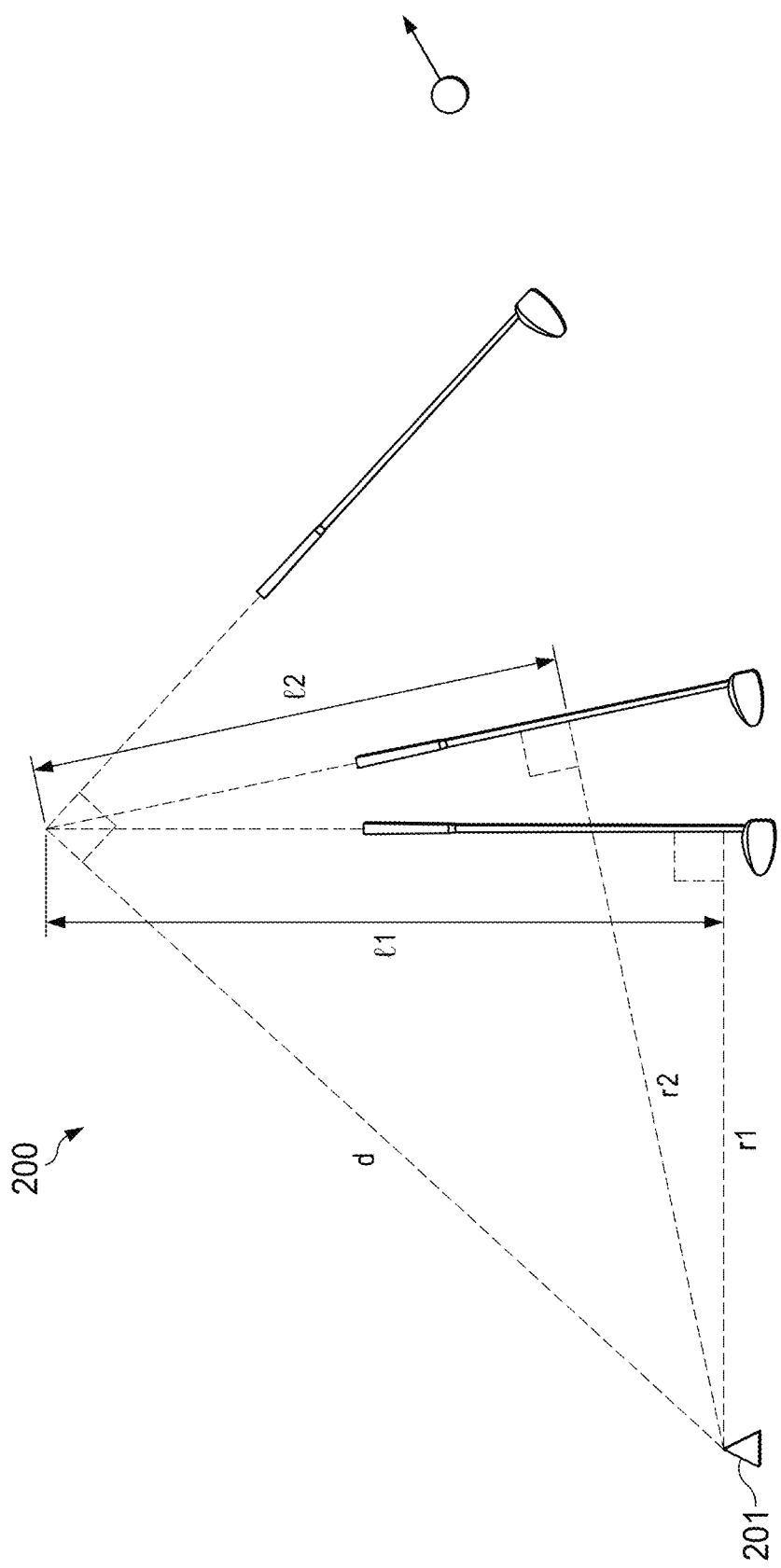

RANGE-GATED IMAGER

TECHNICAL FIELD

This disclosure relates generally to sports technologies and data analytics, and in particular to tracking projectiles, such as balls used in sporting activities.

BACKGROUND

Ball tracking is traditionally performed by an imaging method that uses one or more cameras to track the trajectory of the ball over time. However, as the ball travels further from the camera(s), the accuracy of the ball tracking drops significantly.

SUMMARY

Embodiments are disclosed for a range-gated imager.

In some embodiments, a method comprises: transmitting, with a multi-tone continuous wave (MTCW) radar, a radar signal comprising a first tone and a second tone, where the first tone and the second tone are separated by a frequency gap; receiving, with the MTCW radar, a return signal from a projectile impinged by the radar signal; detecting, with a measuring apparatus, a zero crossing of a phase difference between the first and second tones; and responsive to detecting the zero crossing, gating or triggering, by the measuring apparatus, an imager to capture an image of the projectile.

In some embodiments, the first and second tones are adjusted based on a maximum ball speed or a time period of the phase difference.

In some embodiments, the method further comprises: determining, with the MTCW radar, a radial speed of the projectile; determining, with the measuring apparatus, an estimated trajectory of the projectile based on the radial speed of the projectile; and determining, a first estimate of a range of the projectile based on the estimated trajectory of the projectile.

In some embodiments, a trajectory model optimization is used to determine a first estimate of a range of the projectile.

In some embodiments, the method further comprises determining the frequency gap based on a maximum speed of the imager and a maximum speed of the projectile.

In some embodiments, the method further comprises: estimating a non-ambiguity range of the projectile from the return signal; estimating a distance along a trajectory of the projectile from the MTCW radar based on the estimated non-ambiguity range.

In some embodiments, the imager is gated or triggered to capture a plurality of images at a predefined fractional phase.

In some embodiments, a system comprises: a multi-tone continuous wave (MTCW) radar; an imager; a measuring apparatus configured to: transmit a radar signal comprising a first tone and a second tone, where the first and the second tones are separated by a frequency gap; receive a return signal from a projectile impinged by the radar signal; detect a zero crossing of a phase difference between the first tone and the second tone; and responsive to detecting the zero crossing, gate or trigger the imager to capture an image of the projectile.

In some embodiments, the first and second tones are adjusted based on a maximum projectile speed and a time period of the phase difference.

In some embodiments, the system is configured to determine, with the MTCW radar, a radial speed of the projectile; determining, with the measuring apparatus, an estimated trajectory of the projectile based on the radial speed of the projectile; and determining, with the measuring apparatus, a first estimate of a range of the projectile based on the estimated trajectory of the projectile.

In some embodiments, a trajectory model optimization is used to determine a first estimate of a range of the projectile.

In some embodiments, the measuring apparatus is configured to determine the frequency gap based on a maximum speed of the imager and a maximum speed of the projectile.

In some embodiments, the measuring apparatus is configured to: estimate a non-ambiguity range of the projectile from the return signal; and estimate a distance along a trajectory of the projectile from the MTCW radar based on the estimated non-ambiguity range.

In some embodiments, the imager is positioned between a transmit antenna and a receive antenna of the MTCW radar.

In some embodiments, the imager is positioned to face a same direction as the MTCW antenna.

In some embodiments, the imager is positioned to face an opposite direction as the MTCW antenna.

In some embodiments, the imager and MTCW share the same housing.

In some embodiments, the imager and MTCW radar are located in different housings.

In some embodiments, a first field-of-view of the imager at least partially overlaps with a second field-of-view of the MTCW radar.

In some embodiments, the MTCW radar comprises: at least one transmit antenna; at least one receive antenna; a first transmitter for generating a first transmit signal at a first frequency; a second transmitter for generating a second transmit signal at a second frequency, wherein the first and second frequencies are separated by a frequency gap, and where the first and second frequencies define a non-ambiguity range; a combiner coupled to the transmit antenna and configured to sum the first and second transmit signals into a combined transmit signal to be emitted by the at least one transmit antenna; a splitter coupled to the at least one receive antenna and configured to split a return signal reflected from a projectile into a first return signal and a second return signal; a first quadrature mixer coupled to the splitter for receiving the first return signal, the first quadrature mixer configured to demodulate the first return signal into a first baseband signal; a second quadrature mixer coupled to the splitter for receiving the second return signal, the second quadrature mixer configured to demodulate the second return signal into a second baseband signal; and a processing unit configured to detect a zero phase crossing of a phase difference between the first and second baseband signals, and to generate, in response to the detected zero phase crossing, a gate or trigger signal to gate or trigger the imager to capture an image of the projectile.

In some embodiments, the system further comprises: a fast Doppler block configured to combine two fast Doppler signals from a first set of time samples of the first and second baseband signals; a slow Doppler block configured to generate a slow Doppler signal from a second set of time samples of the first and second baseband signals, wherein the second set of time samples is sampled at a slower sample rate than the first set of time samples, and wherein the slow Doppler block is further configured to detect the projectile in a range dimension using the second set of time samples and to determine a non-ambiguity range bin from the range dimension; a frequency estimator configured to determine a frequency spectrum of the fast Doppler signal, and a speed of the projectile based on the frequency spectrum; a frequency divider configured generate a reduced frequency signal based on the frequency spectrum; and a phase locking block configured to generate the non-ambiguity range based on the non-ambiguity range bin and the reduced frequency signal.

In some embodiments, the frequency estimator is an adaptive filter comprising a sliding discrete Fourier transform (DFT) that estimates a frequency of the fast Doppler signal and follows changes in the frequency of the fast Doppler signal.

Particular embodiments described herein provide one or more advantages over existing systems and methods. For example, the disclosed embodiments are advantageous over systems and methods that use light detection and ranging (LiDAR) which is not reliable for determining the speed of a projectile. The disclosed embodiments are also more cost-effective when compared to systems and methods that use frequency-modulated continuous wave (FMCW) radar or multiple inputs multiple outputs (MIMO) radar. The disclosed embodiments also allow for a more compact footprint compared to stereo camera-based systems.

BRIEF DESCRIPTION OF THE DRAWINGS

FIG. 4B illustrates computation of a shaft angle, according to one or more embodiments.

DETAILED DESCRIPTION

Figure 1:
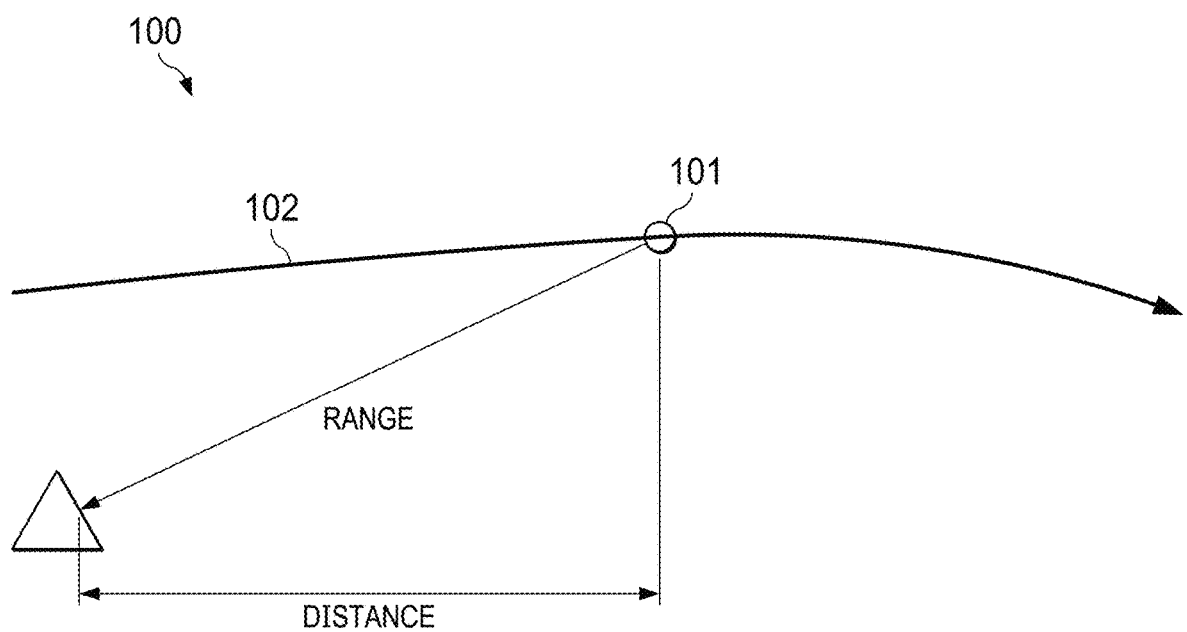
FIG. 1 illustrates the difference between a range from a radar to a projectile and a distance along a trajectory of the projectile, according to one or more embodiments.

The disclosed range-gated imager is part of a system that includes at least one imager (e.g., a camera) and a MTCW radar that generates and transmits two or more distinct tone frequencies. In the example embodiments that follow, two tone frequencies are used. However, any suitable number of tone frequencies can be used. In some embodiments, the terms "range-triggered camera" and "range-gated imager" have the same meaning and thus in the current disclosure, they may be used interchangeably. As used herein, the term "range" refers to the range of the projectile from the radar or Euclidean distance between the projectile and the radar. In some embodiments, the range may include a range with ambiguity and a non-ambiguity range. In some embodiments, the non-ambiguity range may be obtained from the range with ambiguity on post-processing. As used herein, the terms "range bin" and "bin" have the same meaning and in the present disclosure, they are used interchangeably.

In some embodiments, the MTCW radar measures the speed of a projectile and the range to the projectile by constructing a two-tone frequencies difference signal phase and providing an imager gating signal (e.g., external VSync signal for a camera) at the two tones frequencies difference signal phase "zero crossing." In some embodiments, the range is a range to the projectile modulo the non-ambiguity range. For example, for a frequency gap of 200 MHz between two frequencies, with an imager frame rate of 66.7 frames per second (fps) and a projectile moving at a radial speed of 50 m/s, the non-ambiguity range bin is modulo 75 cm along the range from the radar to the projectile. In some embodiments, the imager frame rate is selectable by a user where a shorter or longer non-ambiguity range results from a higher or lower imager frame rate, respectively.

It is to be appreciated that when two or more tone frequencies are used, e.g., three tone frequencies are used, there may be a plurality of zero crossings of phase difference generated during the measurement. In some embodiments, in a system where two tone frequencies are used, the plurality of zero crossings may include a first zero crossing, a second zero crossing, a third zero crossing and so forth.

Using the technique described herein, the range estimation (thus distance estimation) within the non-ambiguity range bin (i.e., the accuracy of the ball finding) is improved. As the location of the ball within the non-ambiguity range bin is determined with higher accuracy than existing methods, the absolute range (thus absolute distance) from the MTCW radar can also be calculated more accurately. In some embodiments, the accuracy of the ball finding estimation can be improved. For example, the absolute distance is bound to the ambiguity solution obtained from post-processing using imager data (e.g., ball 2D position or a golf club head) and from sensor data fusion.

In some embodiments, the first zero crossing may appear with an ambiguity. In an exemplary embodiment, the first zero crossing seen by the radar may have an ambiguity when the projectile is still out of the imager field-of-view (FOV). To minimize or eliminate the ambiguity, in some embodiments, the range bin may be broadened by adjusting the bandwidth or gap between the two-tone frequencies. In an exemplary embodiment, the range bin is broadened from about 75 cm to 150 cm by narrowing the frequency gap from 200 MHz to 100 MHz, e.g., when 24.2 GHz and 24.1 GHz frequencies are used. This adjustment will increase the time of flight within a single range bin and the time between zero crossings.

In some embodiments, the accuracy of ball size may be used to obtain a reference and to choose the range bin. An exemplary embodiment of using the ball size to minimize the ambiguity range is described in the U.S. patent application Ser. No. 14/830,375 filed on Aug. 19, 2015, which is herein incorporated by reference in its entirety.

In some embodiments, a trajectory model/optimization described herein is used to remove the ambiguity of the range bin for, e.g., the first zero crossing seen by the radar described above. Regarding the trajectory model/optimization method, it is important to note that a range of the projectile 101 from the radar 100 is different than a distance of the projectile 101 along its trajectory 102, as illustrated in FIG. 1. As used herein, the term "range" refers to Euclidean distance between the radar and the moving object, whereas the term "distance" refers to the distance measured based on the length along the trajectory.

Figure 2A:
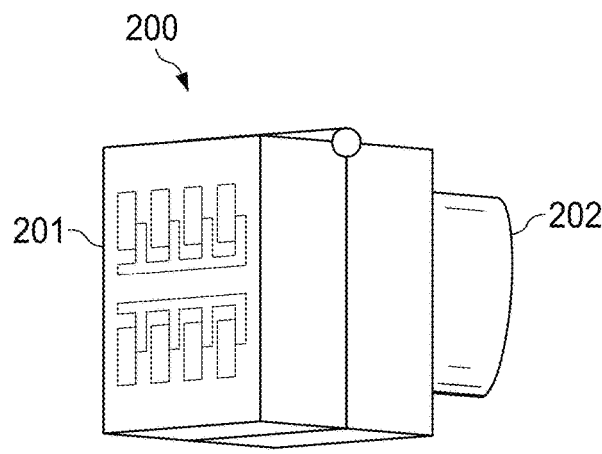
FIGS. 2A-2C illustrate example configurations of a range-gated imager system, according to one or more embodiments.
Figure 2B:
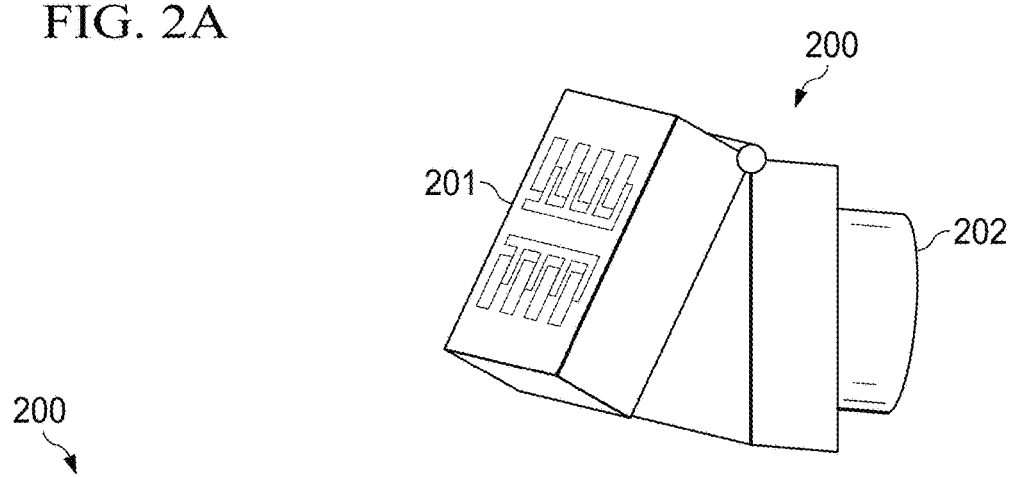
Figure 2C:
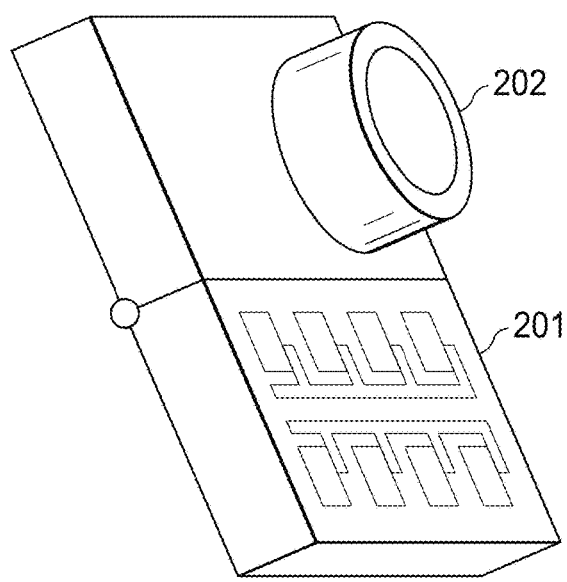

FIGS. 2A-2C illustrate example orientations of a range radar-triggered camera system 200, according to one or more embodiments. Referring to FIG. 2A, in one embodiment, the radar antenna 201 (e.g., patch antennas) is pointing in a direction opposite the camera 202. Referring to FIG. 2B, in one embodiment, the radar antenna 201 is pointing in a direction opposite the camera 202 with both the antenna 201 and camera 202 boresights tilted by the same or different angles. In the embodiment as described in FIGS. 2A and 2B, advantageously, it is not necessary to match camera field of view (FOV) and radar FOV. Referring to FIG. 2C, in one embodiment, the radar antenna 201 is pointing in the same direction as the camera 202. In such an embodiment, camera FOV may be configured to match radar FOV. In other words, camera FOV may be at least partially overlapping with radar FOV Other embodiments include the antenna 201 and camera 202 being mounted side-by-side, or the antenna 201 mounted above camera 202 or vice versa. The antenna 201 and camera 202 can be mounted within the same housing or be mounted in separate housings. In some embodiments, camera 202 and the antenna 201 can be collocated within the same housing. In some embodiments, camera 202 can be positioned as close as possible to the antenna 201. In some embodiments, the camera 202 can be placed between transmits antenna Tx and receive antenna Rx. In some embodiments, the camera 202 may be positioned equidistant between transmits antenna Tx and receive antenna Rx.

Figure 3A:
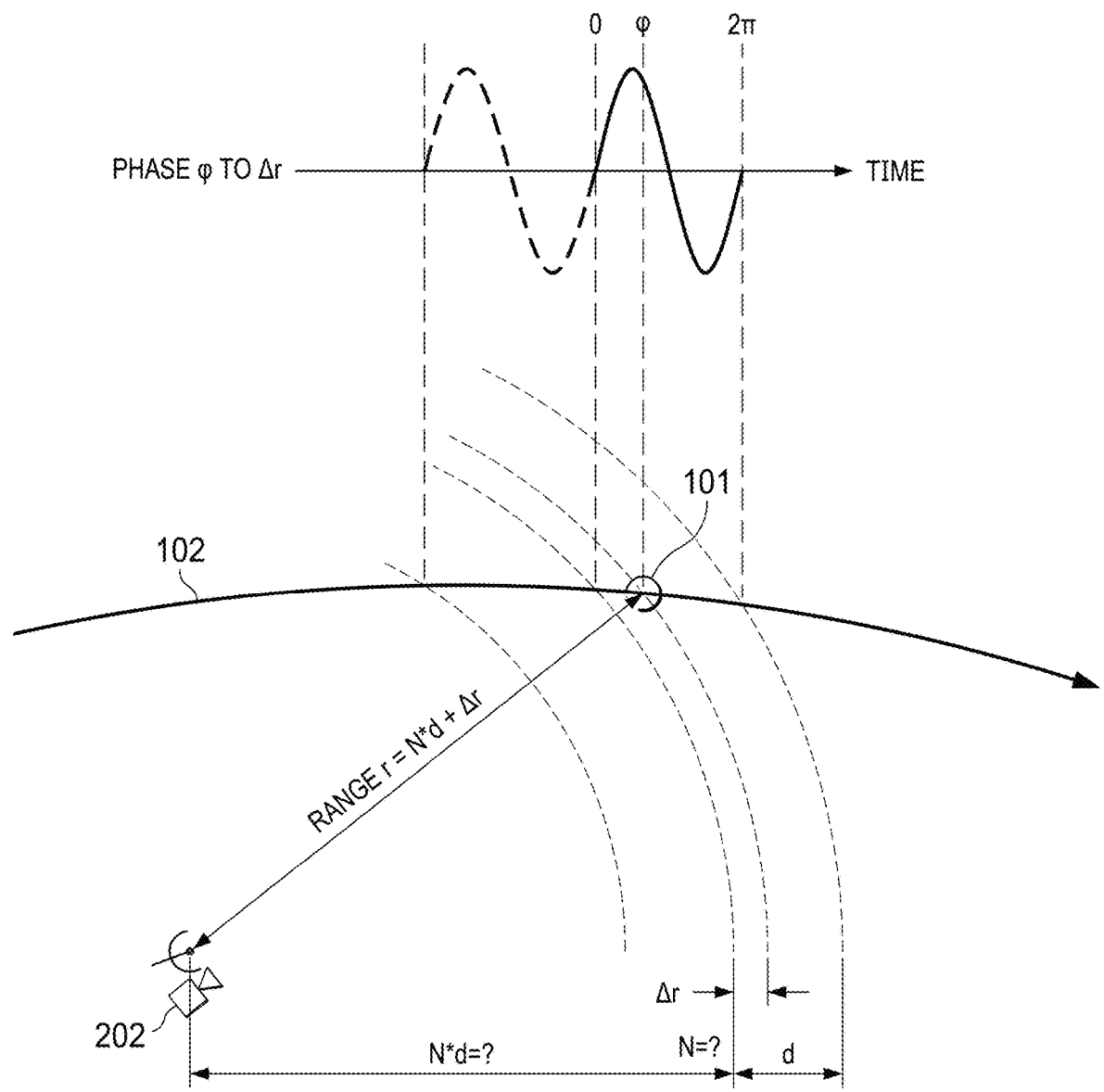
FIG. 3A illustrates computation of a range with ambiguity using a MTCW radar, according to one or more embodiments.

FIG. 3A illustrates computation of a range of projectile 101 using two-tone CW radar 201, according to one or more embodiments. In the example shown herein, the first tone frequency "a" ($F_{rfa}$) is 24.0 GHz and a second tone frequency "b" ($F_{rfb}$) is 24.2 GHz. The radial speed u_max of the projectile 101 while traveling along trajectory 102 with respect to the radar is 50 m/s. With these example values, the non-ambiguity range ("range bin") d is given by:

d=c/2 (24.2−24 GHz)=75 cm, where c is the speed of light in air.

Thus, in this example, the phase difference zero crossing occurs every 75 cm. This results in imager 202 being triggered at each zero crossing, i.e. every 75 cm, with a maximum effective frame rate (u_max/d) is 66.6 Hz. It is to be appreciated that when the radial speed of the projectile 101 is substantially higher, using the same relationship above, the maximum effective frame rate of the camera will be substantially higher as well.

Determining Range Ambiguity at First Zero Crossing

In the same example, it is noted that the first zero crossing appears with an ambiguity. Thus, post-processing optimization using a trajectory model/optimization can be used to estimate the radar range ambiguity (bias), $r_0$, in the radar range measurement of the first zero crossing according to Equation [1], where K is the total number of radar samples k:

$$r_0 = \frac{\left(\frac{1}{K}\sum_{k=0}^{K-1} \frac{r_k}{(P_k b_k)^2}\right) - \left(\frac{1}{K}\sum_{k=0}^{K-1} \frac{r_k}{|P_k b_k|}\right)\left(\frac{1}{K}\sum_{k=0}^{K-1} \frac{1}{|P_k b_k|}\right)}{\left(\frac{1}{K}\sum_{k=0}^{K-1} \frac{1}{(P_k b_k)^2}\right) - \left(\frac{1}{K}\sum_{k=0}^{K-1} \frac{1}{|P_k b_k|}\right)\left(\frac{1}{K}\sum_{k=0}^{K-1} \frac{1}{|P_k b_k|}\right)} \quad [1]$$

Where:

$P_k = \frac{(p_k - p_c)}{(p_{kz} - p_{cz})}$ – normalized relative position, $p_k = \{p_{kx}, p_{ky}, p_{kz}\}$— sampled 3D position at the time $t_k$,
$p_c = \{p_{cx}, p_{cy}, p_{cz}\} = -sR^{-1}$—camera 3D position, [2]
$R = \{h_{xx}, h_{xy}, h_{xz}; h_{yx}, h_{yy}, h_{yz}; h_{zx}, h_{zy}, h_{zz}\}$—"rotational" part of a camera projection matrix,
$s = \{h_x, h_y, h_z\}$—"translational" part of the camera projection matrix,
$p_r = \{p_{rx}, p_{ry}, p_{rz}\}$—radar 3D position, $b_k = \frac{P_k}{\sqrt{P_k^2}}$, ($p_k$ is a vector), $r_k = \tilde{r}_k - r_0 = \sqrt{(p_k - p_r)(p_k - p_r)^T}$ or $r_k = \tilde{r}_k - r_0 = \frac{(p_k - p_r)(p_k - p_r)^T}{\sqrt{(p_k - p_r)(p_k - p_r)^T}}$ —with $r_k$ being a radar range with unsolved ambiguity (bias) at the time $t_k$, [3]
$\tilde{r}_k - r_0 = (p_k - p_r)b_k$—with $\tilde{r}_k$ being a true radar range (with bias added, ambiguity solved), at first $r_0$ is assumed to be zero. [4]

Figure 3B:
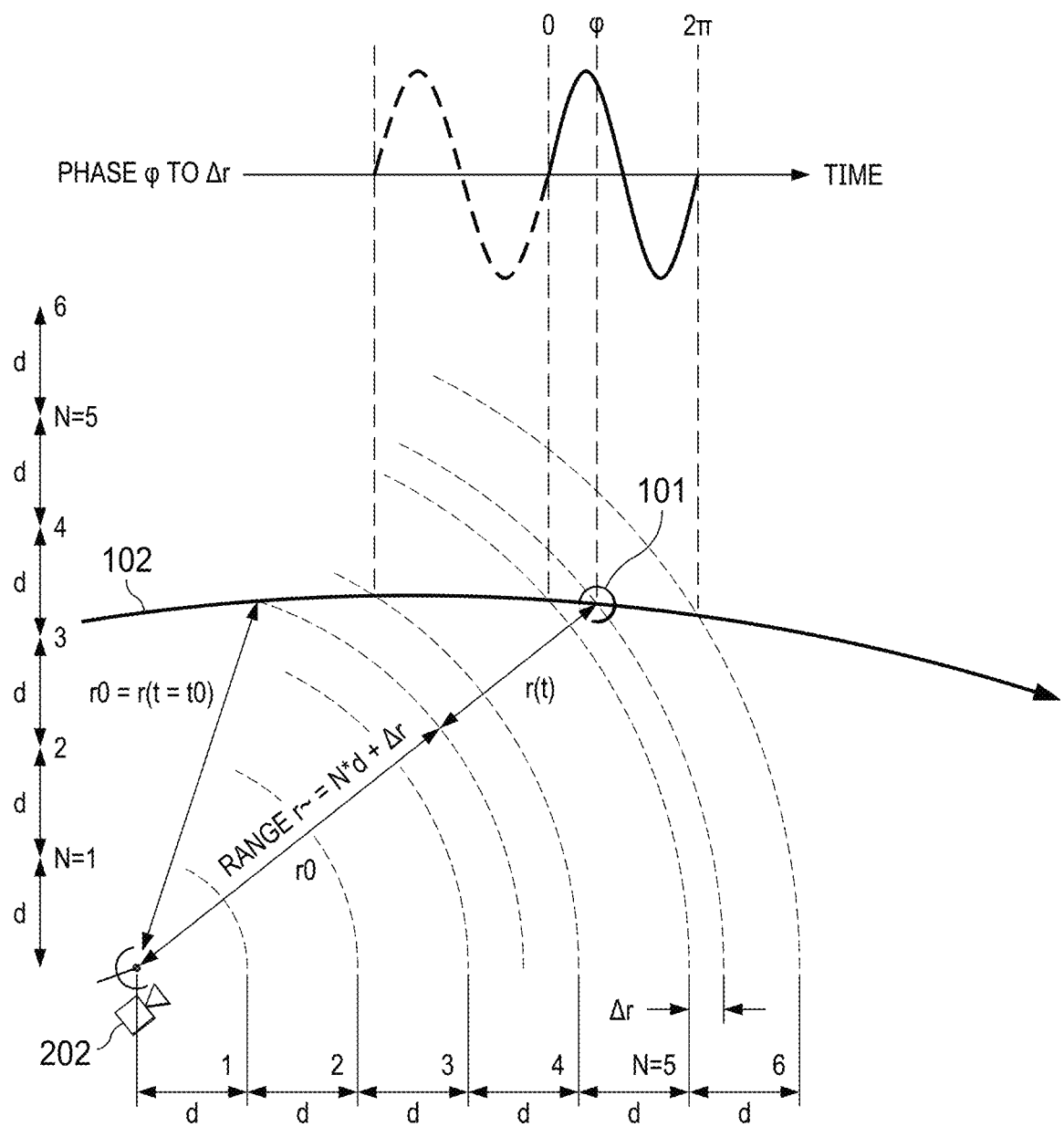
FIG. 3B illustrates computation of a non-ambiguity range, obtained on post-processing, using a MTCW radar, according to one or more embodiments.

The range ambiguity (bias) at the first zero crossing, $r_0$, is computed according to Equation [1] and subtracted from the measured radar range to determine the non-ambiguity radar range. FIG. 3B illustrates computation of the non-ambiguity range, obtained on post-processing, using two-tone CW radar 201, according to one or more embodiments.

Figure 4A:
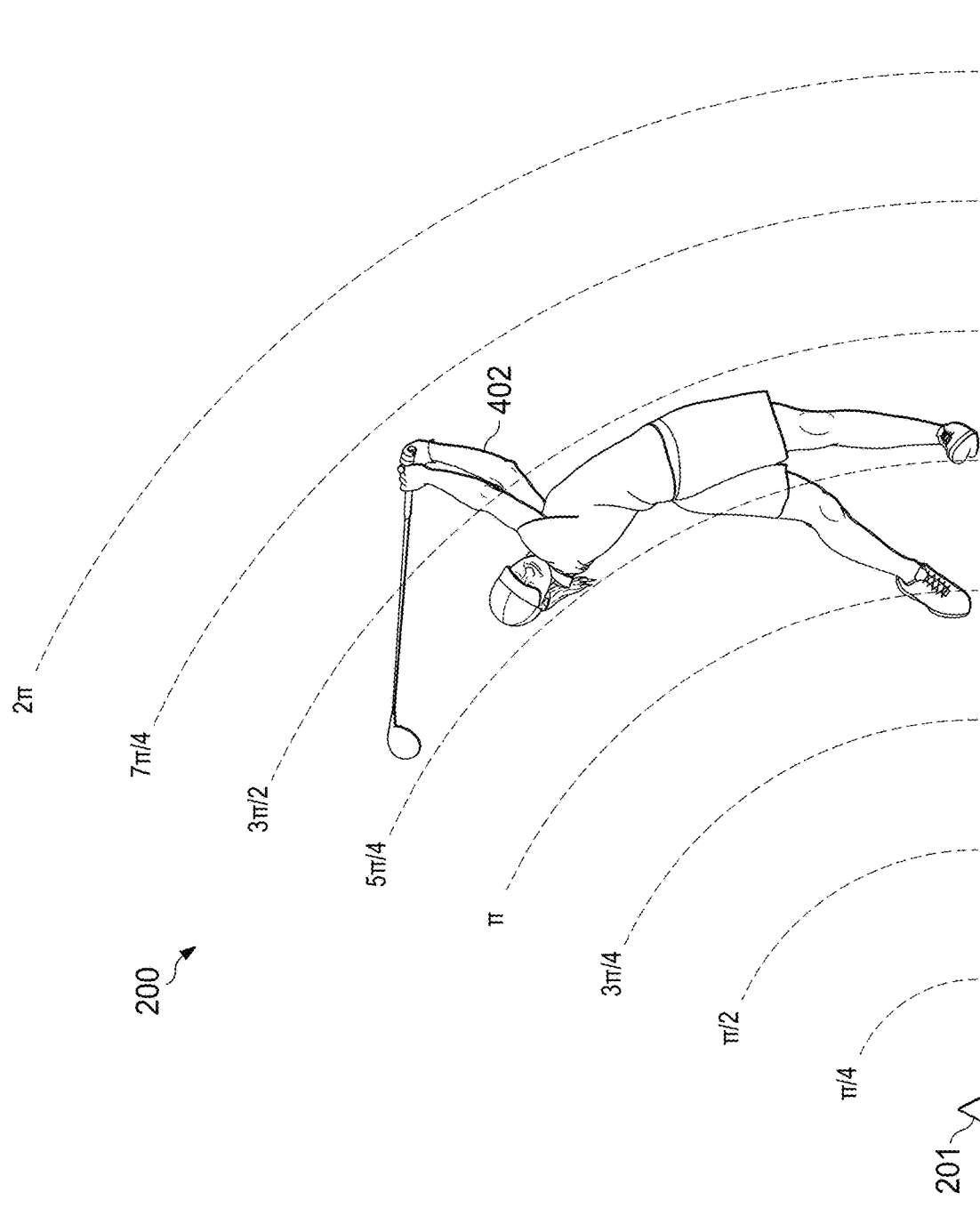
FIG. 4A illustrates a system that includes an imager that is gated/triggered to capture a plurality of images at a predefined fractional phase within the non-ambiguity range for a golfer and a golf club, according to one or more embodiments.

FIG. 4A illustrates system 200 that includes imager 202 that is triggered to capture a plurality of images of user 402 swinging a golf club for a predefined fractional phase within the non-ambiguity range to provide additional insights, by time and range, about the shaft angle to the radar and club angular speed, according to one or more embodiments. In some embodiments, user 402 is a golfer, baseball player, softball player or cricket player.

Determination of Shaft Angle

FIG. 4B illustrates computation of a shaft angle, according to one or more embodiments. In some embodiments, the shaft angle to the radar can be computed from the slopes of the strokes, which are determined from the change of radial speed of a sliding reflection point over the golf club shaft. Within that short period of time, the angular speed of the club is negligible the difference in radial (linear) speed thus comes from the sliding reflection over the shaft (i.e., the reflection point is sliding towards or back to the center of rotation). Based on these observations, the following parameters are defined:

Range: $r(t)=d\cos(\omega t+\varphi)$, where $\omega$ is angular speed, and $\varphi$ is phase angle [5]

Reflection point offset: $l(t)=d\sin(\omega t+\varphi)$ [6]

Center of rotation constraint: $d^2=r^2+l^2$ [7]

The reflection point radial speed (by Doppler) is given by:

$u=r'=-d\omega\sin(\omega t+\varphi)=-\omega l$;(first derivative of range) [8]

The slope of the reflection point radial speed is derivative of the speed is given by:

$$u' = -d\omega^2\cos(\omega t_n + \varphi) = -\omega^2 r;$$ [9]
$$u'' = d\omega^3\sin(\omega_n t + \varphi) = -\omega^2$$ [10]

The angular speed can be estimated as follows:

$$\omega = -\frac{u}{l};$$ [11]

$$\omega^2 = -\frac{u'}{r}; \omega = \sqrt{\left|\frac{u'}{r}\right|}$$ [12a]

$$\omega^2 = -\frac{u''}{u}; \omega = \sqrt{\left|\frac{u''}{u}\right|}$$ [12b]

Equating both [11] and [12a] gives:

$$\frac{u^2}{l^2} = -\frac{u'}{r}; l^2 = -\frac{u^2}{u'}r; l(t) = \sqrt{\left|\frac{u^2}{u'}r\right|}$$ [13]

For a single tone CW radar, the angular speed is:

$$\omega = \sqrt{\left|\frac{u''}{u}\right|}, \text{ then } l(t) = -\frac{u}{\omega} \text{ by (1)}, \omega = -\frac{u}{l}$$ [14]

For two-tone CW radar, if r is known, $$\omega = \sqrt{\left|\frac{u'}{r}\right|}, \text{ then } l(t) = -\frac{u}{\omega}; \text{ by (1)}, \omega = -\frac{u}{l},$$ [15]

or directly $$l(t) = \sqrt{\left|\frac{u^2}{u'}r\right|}$$

from Equation [1].

Once the r(t) and l(t) are determined, the shaft angle to radar (one of two) is given by:

$\alpha(t)=a\tan 2(l,r)=\omega t+\varphi,$ [16]

where the swing plane tilt angle is still unknown.

Referring to FIGS. 3A, 3B and 4A, in some embodiments, the location of the object is identified in a specific bin, the position of the object in that bin may be derived from the phase j. In some embodiments, the phase j is a fraction of the range bin Dr. In some embodiments, for two sine waves representing the two tones frequencies, the range bin is 2p phase. In some embodiments, the phase j may be any values higher than zero but lower than 2p phase. In some embodiments, the triggering of the imager 202 may be done at fractional phase Dr for example n*p/4 or n*p/8, with n being integer from 0 to 8 or 0 to 16, respectively.

For avoidance of doubt, for a fractional phase Dr of n*p/4, n is an integer from 0 to 8 with 2p being one period. For a fractional phase of n*p/8, n is an integer from 0 to 16 with 2p being one period. In some embodiments, the range r defined herein is an absolute range r=Nd+Δr, where d is non-ambiguity range, N is an integer representing range bin number.

As can be seen from FIG. 4A, system 200 is configured such that imager 202 is gated/triggered to capture a plurality of images at a predefined fractional phase Dr of n*p/4 or n*p/8 to provide additional insights, by time and range, about shaft angle and club angular speed. In some embodiments, the additional insights relate to golf club motion or bat motion (in the case of baseball, softball or cricket) within a single non-ambiguity range bin. In an exemplary embodiment, the range described in FIG. 4A is a non-ambiguity range for the golfer and the golf club staying within the same first range bin during the swing of the golf club. In some embodiments, system 200 can include a flash that can be used when acquiring images. System 200 can flash at a rate higher than the camera frame rate (fps) to obtain a sequence of ball images on a single camera frame (e.g., the flash can be switched on and off, alternately on a single camera frame). For example, the flash can be configured to be on at the zero crossing or fractional phase.

In some embodiments, more than two tone frequencies, e.g. three tone frequencies, can be used to improve the non-ambiguity range and range accuracy. Gaps between patch antennas of an antenna can be designed according to the desired frequency margins. In some embodiments, the number of rows and columns of the antenna can be used to define the shape of antenna, which may affect the sensitivity profile of the radar. In some embodiments, the patch antenna design may be an antenna of 2×2, 3×3 or 4×4 patch array antennas.

Figure 5A:
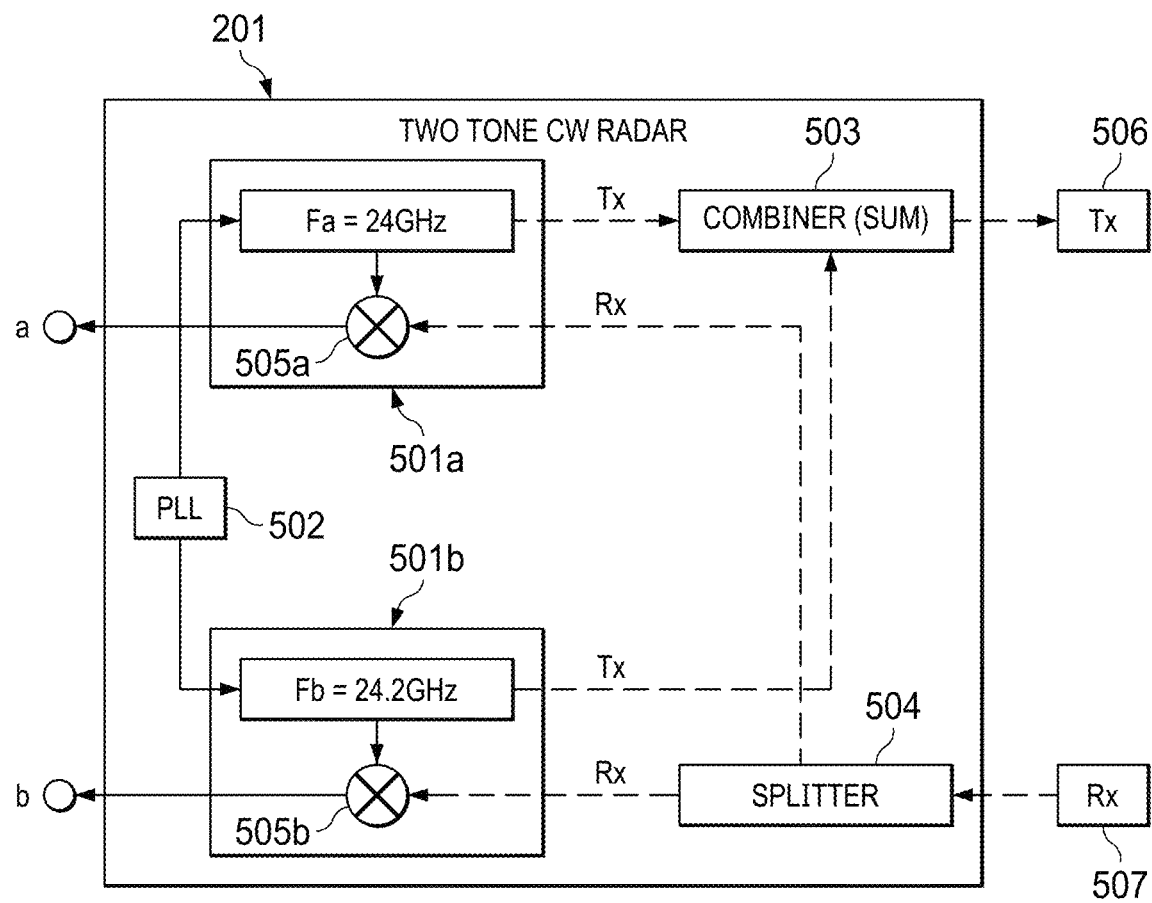
FIG. 5A is a block diagram of a MTCW radar according to one or more embodiments.

FIG. 5A is a block diagram of a MTCW radar 201 according to one or more embodiments. MTCW radar 201 includes transceivers 501a, 501b, frequency generator 502 combiner 503 and splitter 504.

In some embodiments, frequency generator 502 comprises at least one phase-locked loop (PLL) circuit. Frequency generator 502 locks frequency sources Fa, Fb (e.g., voltage controlled oscillators) to a common crystal reference oscillator (not shown). Frequency generator 502 generates two frequencies with a frequency gap (e.g., a configurable frequency gap) between these two frequencies. As described herein, the two frequencies define the non-ambiguity range. Combiner 503 (e.g., a Wilkinson power combiner) is also provided and sums the two transmit signals generated by transceivers 501a, 501b into a single combined transmit signal which is optionally sent through a power amplifier (not shown) before transmission by transmit antenna 506 (Tx).

Return signals that impinge the target projectile are received by receive antenna 507 (Rx) and input into splitter 504, which splits the return signal (e.g., splits evenly) to quadrature mixers 505a, 505b, respectively, which subsequently demodulate the return signal into the two-tone baseband signals (output through ports "a" and "b"). In some embodiments, the return signal received by the receive antenna 507 is split equally at splitter 504 into two return signals, where each return signal is subsequently demodulated by each of quadrature mixers 505a, 505b with the respective frequencies generated by frequency generator 502. For clarity, as shown in FIG. 5A, a first signal is demodulated by quadrature mixer 505a with a first frequency of 24 GHz and a second signal is demodulated by quadrature mixer 505b with a second frequency of 24.2 GHz.

In some embodiments, the two-tones radar may be considered to work as two separate single tone CW radars sharing the same transmit antenna 506 and receive antenna 507. In some embodiments, the two-tones radar may work as two separate single tone CW radars sharing the same transmit antenna 506 and receive antenna 507 with a known (e.g., configurable) frequency gap. In some embodiments, the known frequency gap is obtained from a common source to ensure the first frequency does not drift with respect to the second frequency. In some embodiments, the frequency gap is calibrated with common PLL circuit 506.

In some embodiments, sharing transmit and receive antennas 506, 507 may be necessary so that the ranges may be measured by the phase difference. In some embodiments, shared transmit and receive antennas 506, 507 may result in the phase difference at least partially independent from angles to the object as the single transmit antenna and the single receive antenna radar are not capable of making angular measurements.

In some embodiments, the return signal is passed through a low noise amplifier (not shown) and demodulated to the two-tone baseband signals by mixers 505a, 505b without an intermediate frequency. Since the radar is MTCW, one transmit antenna 506 and one receive antenna 507 is used to provide enhanced isolation between the transmitter and receiver. The baseband signals are output through ports "a" and "b" to pre-processing/adaptive filter block 508, as shown in FIG. 5B.

Figure 5B:
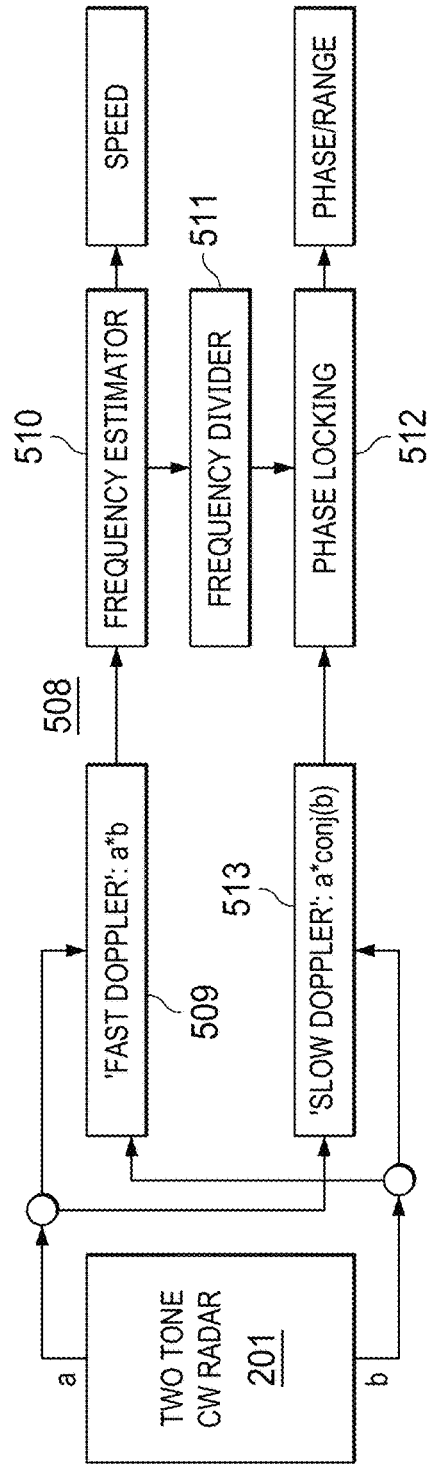
FIG. 5B is a block diagram of a pre-processing/adaptive block of the MTCW radar show in FIG. 5A, according to one or more embodiments.

FIG. 5B is an exemplary embodiment of the system described herein, used for tracking a moving object. In some embodiments, the moving object is a ball. In such an embodiment, it is assumed that there is no or minimal interference from other motions including human body (pitcher, batter or hitter), baseball bat or golf club.

As shown in FIG. 5B, a block diagram of pre-processing/adaptive filter block 508 is coupled to ports "a" and "b" of the MTCW radar 201 shown in FIG. 5A, according to one or more embodiments. In some embodiments, as can be seen from FIG. 5A, fast Doppler block 509 combines two fast Doppler signals (carrier frequency drift) for input into frequency estimator 510. In some embodiments, frequency estimator 510 is an adaptive filter that tracks the frequency of a moving object. In some embodiments, the adaptive filter includes a sliding discrete Fourier transform (DFT) that estimates the main frequency of a certain signal and follows its changes. In an exemplary embodiment, fast Doppler frequencies may be the two-tones frequencies used including 24 GHz, 24.1 GHz and 24.2 GHz, and slow Doppler frequencies may be the frequency gap of 100 MHz and 200 MHz. In some embodiments, only the fast Doppler frequencies are used to perform a frequency estimation. In such an embodiment, the frequency estimation at high frequency has lower time latency as it gets more periods for the same time frame. For this reason, although it may be possible to use the slow Doppler frequencies in the frequency estimation, estimating the frequency directly on the slow Doppler frequencies are less preferred.

As shown in FIG. 5B, the frequency spectrum of the fast Doppler computed by frequency estimator 510 is input into frequency divider 511 to obtain the slow Doppler. The output of frequency divider 511, i.e. slow Doppler, is input into phase locking block 512. Slow Doppler block 513 detects the target projectile in the range dimension using slow-time samples of the baseband signals to determine the phase (thus the non-ambiguity range bin) which is input into phase locking block 512. The phase locking block 521 generates the non-ambiguity phase/range.

Figure 5C:
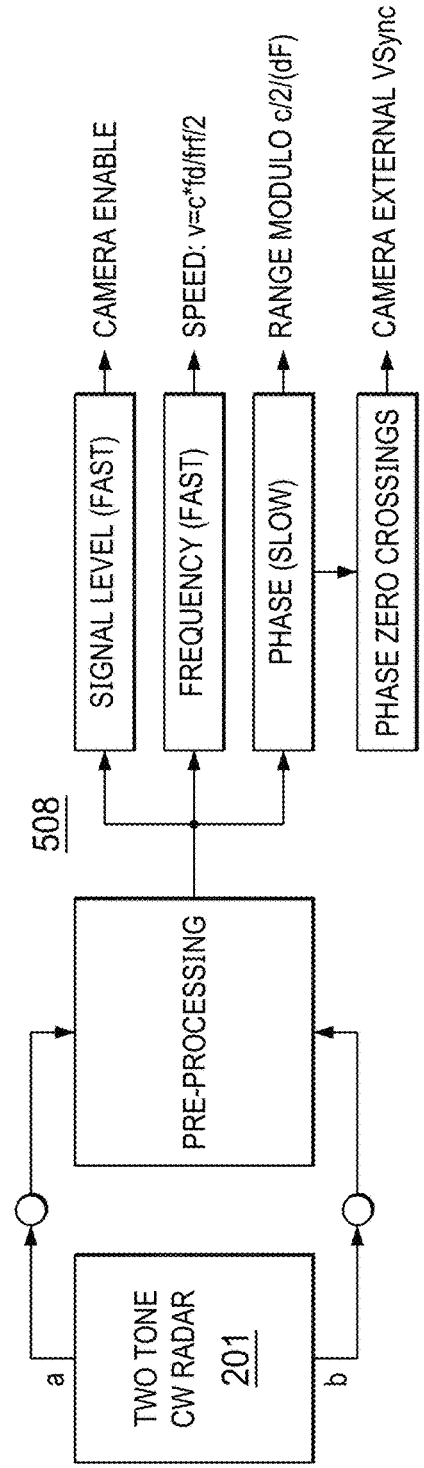
FIG. 5C is a block diagram illustrating output signals of the pre-processing/adaptive filter block shown in FIG. 5B, according to one or more embodiments.

FIG. 5C is an exemplary embodiment describing the logic of operation when the object tracking begins and ends. As shown in FIG. 5C, a block diagram illustrating output signals of the pre-processing/adaptive filter block 508 shown in FIG. 5B, according to one or more embodiments. The outputs include signal level (fast), frequency (fast), phase (slow) and phase zero crossings. The signal level (fast) is used to enable the imager, the frequency (fast) is used to compute the speed of the projectile, the phase (slow) is used to compute the range modulo and the phase zero crossings are used to generate a gate/trigger signal (e.g., a camera external VSync signal). In some embodiments, the operation may include estimating parameters online (e.g., frequency, phase). In some embodiments, the operation may include identifying which parameters to be collected for the post-processing.

Figure 6:
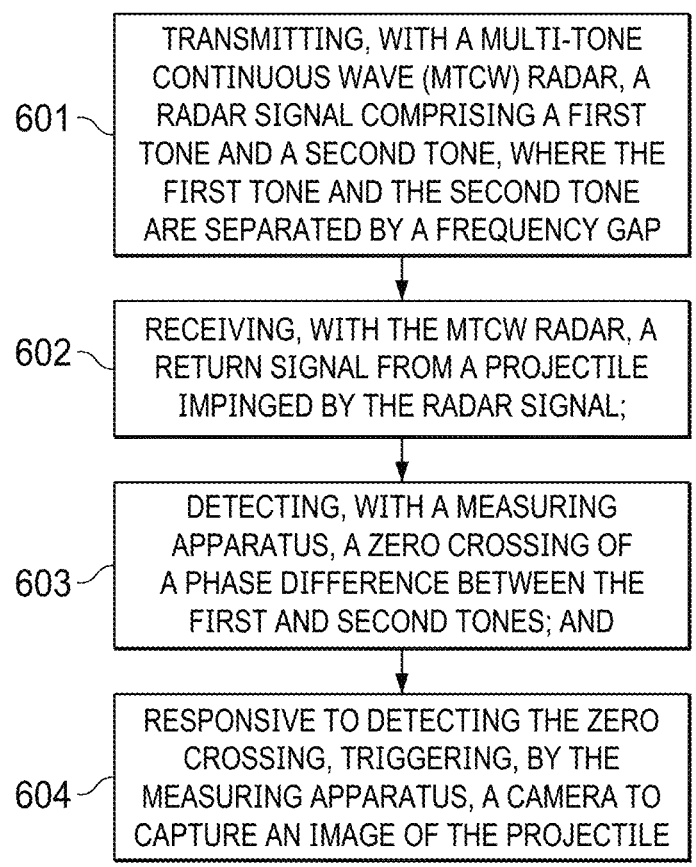
FIG. 6 is a flow diagram of a process of gating an imager (e.g., a camera) to capture an image of a projectile based on a range determined by a MTCW radar, according to one or more embodiments.

FIG. 6 is a flow diagram of a process 600 of gating/triggering an imager/camera to capture an image of a projectile based on a range determined by a multi-tone CW radar, according to one or more embodiments. In some embodiments, as described herein, the range may be a range with ambiguity. In some embodiments, a non-ambiguity range can be obtained from the range with ambiguity following a post-processing optimization procedure.

Process 600 includes: transmitting, with a multi-tone continuous wave (MTCW) radar, a radar signal comprising a first tone and a second tone, where the first tone and the second tone are separated by a frequency gap (601); receiving, with the MTCW radar, a return signal from a projectile impinged by the radar signal (602); detecting, with a measuring apparatus, a zero crossing of a phase difference between the first and second tones (603); and responsive to detecting the zero crossing, triggering, by the measuring apparatus, a camera to capture an image of the projectile (604). The captured images can be used to construct a trajectory of the projectile and/or three-dimensional (3D) visualizations of same. Each of these steps was described in detail in reference to FIGS. 1-5.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The invention claimed is:

1. A method comprising:
    transmitting, with a multi-tone continuous wave (MTCW) radar, a radar signal comprising a first tone and a second tone, where the first tone and the second tone are separated by a frequency gap;
    receiving, with the MTCW radar, a return signal from a projectile impinged by the radar signal;
    detecting, with a measuring apparatus, a zero crossing of a phase difference between the first and second tones; and
    responsive to detecting the zero crossing, gating or triggering, by the measuring apparatus, an imager to capture an image of the projectile.

2. The method of claim 1, wherein the first and second tones are adjusted based on a maximum projectile speed or a time period of the phase difference.

3. The method of claim 1, further comprising:
    determining, with the MTCW radar, a radial speed of the projectile;
    determining, with the measuring apparatus, an estimated trajectory of the projectile based on the radial speed of the projectile; and
    determining, a first estimate of a range of the projectile based on the estimated trajectory of the projectile.

4. The method of claim 1, wherein a trajectory model optimization is used to determine a first estimate of a range of the projectile.

5. The method of claim 1, further comprising:
    determining the frequency gap based on a maximum speed of the imager and a maximum speed of the projectile.

6. The method of claim 1, further comprising:
    estimating a non-ambiguity range of the projectile from the return signal;
    estimating a distance along a trajectory of the projectile from the MTCW radar based on the estimated non-ambiguity range.

7. The method of claim 1, wherein the imager is gated or triggered to capture a plurality of images at a predefined fractional phase.

8. A system comprising:
    a multi-tone continuous wave (MTCW) radar;
    an imager;
    a measuring apparatus configured to:
        transmit a radar signal comprising a first tone and a second tone, wherein the first and the second tones are separated by a frequency gap;
        receive a return signal from a projectile impinged by the radar signal;
        detect a zero crossing of a phase difference between the first tone and the second tone; and
        responsive to detecting the zero crossing, gate or trigger the imager to capture an image of the projectile.

9. The system of claim 8, wherein the first and second tones are adjusted based on a maximum projectile speed and a time period of the phase difference.

10. The system of claim 8, wherein the system is configured to:
    determine, with the MTCW radar, a radial speed of the projectile;
    determine, with the measuring apparatus, an estimated trajectory of the projectile based on the radial speed of the projectile; and
    determine, with the measuring apparatus, a first estimate of a range of the projectile based on the estimated trajectory of the projectile.

11. The system of claim 8, wherein a trajectory model optimization is used to determine a first estimate of a range of the projectile.

12. The system of claim 8, wherein the measuring apparatus is configured to:
    determine the frequency gap based on a maximum speed of the imager and a maximum speed of the projectile.

13. The system of claim 8, where the measuring apparatus is configured to:
    estimate a non-ambiguity range of the projectile from the return signal; and
    estimate a distance along a trajectory of the projectile from the MTCW radar based on the estimated non-ambiguity range.

14. The system of claim 8, wherein the imager is positioned between a transmit antenna and a receive antenna of the MTCW radar.

15. The system of claim 8, wherein the imager is positioned to face a same direction as the MTCW antenna.

16. The system of claim 8, wherein the imager is positioned to face an opposite direction as the MTCW antenna.

17. The system of claim 8, wherein the imager and MTCW share the same housing.

18. The system of claim 8, wherein the imager and MTCW radar are located in different housings.

19. The system of claim 8, wherein a first field-of-view of the imager at least partially overlaps with a second field-of-view of the MTCW radar.

20. The system of claim 8, wherein the MTCW radar comprises:
    at least one transmit antenna;
    at least one receive antenna;
    a first transmitter for generating a first transmit signal at a first frequency;
    a second transmitter for generating a second transmit signal at a second frequency, wherein the first and second frequencies are separated by a frequency gap, and where the first and second frequencies define a non-ambiguity range;
    a combiner coupled to the transmit antenna and configured to sum the first and second transmit signals into a combined transmit signal to be emitted by the at least one transmit antenna;
    a splitter coupled to the at least one receive antenna and configured to split a return signal reflected from a projectile into a first return signal and a second return signal;
    a first quadrature mixer coupled to the splitter for receiving the first return signal, the first quadrature mixer configured to demodulate the first return signal into a first baseband signal;

a second quadrature mixer coupled to the splitter for receiving the second return signal, the second quadrature mixer configured to demodulate the second return signal into a second baseband signal; and a processing unit configured to detect a zero phase crossing of a phase difference between the first and second baseband signals, and to generate, in response to the detected zero phase crossing, a gate or trigger signal to gate or trigger the imager to capture an image of the projectile.

21. The system of claim 20, wherein the processing unit further comprises:

a fast Doppler block configured to combine two fast Doppler signals from a first set of time samples of the first and second baseband signals;

a slow Doppler block configured to generate a slow Doppler signal from a second set of time samples of the first and second baseband signals, wherein the second set of time samples is sampled at a slower sample rate than the first set of time samples, and wherein the slow Doppler block is further configured to detect the projectile in a range dimension using the second set of time samples and to determine a non-ambiguity range bin from the range dimension;

a frequency estimator configured to determine a frequency spectrum of the fast Doppler signal, and a speed of the projectile based on the frequency spectrum;

a frequency divider configured generate a reduced frequency signal based on the frequency spectrum; and a phase locking block configured to generate the non-ambiguity range based on the non-ambiguity range bin and the reduced frequency signal.

22. The system of claim 21, where the frequency estimator is an adaptive filter comprising a sliding discrete Fourier transform (DFT) that estimates a frequency of the fast Doppler signal and follows changes in the frequency of the fast Doppler signal.

* * * * *